(No Model.)
A. TURNER.
TRUCK FOR MOVING HARVESTERS.
No. 276,734. Patented May 1, 1883.
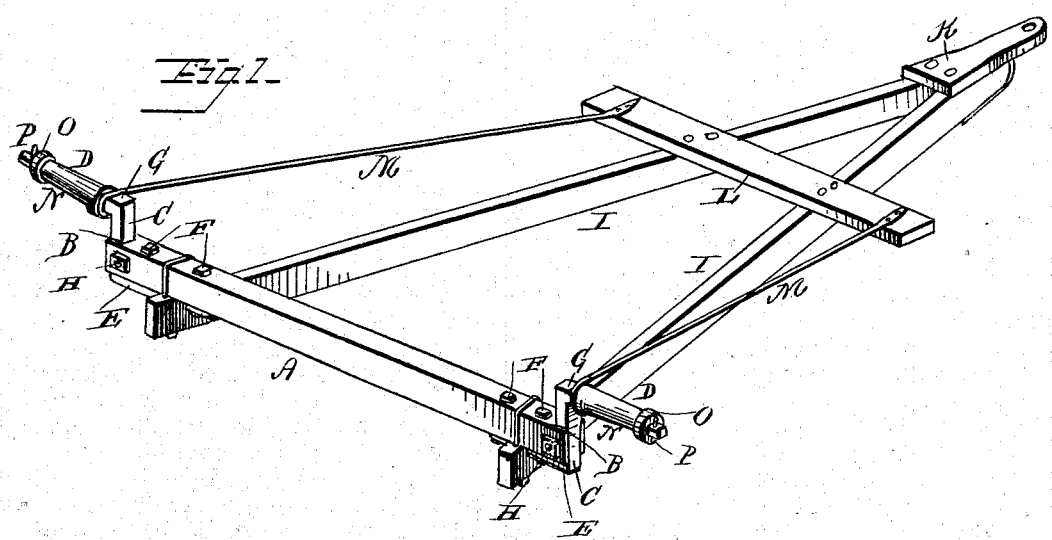
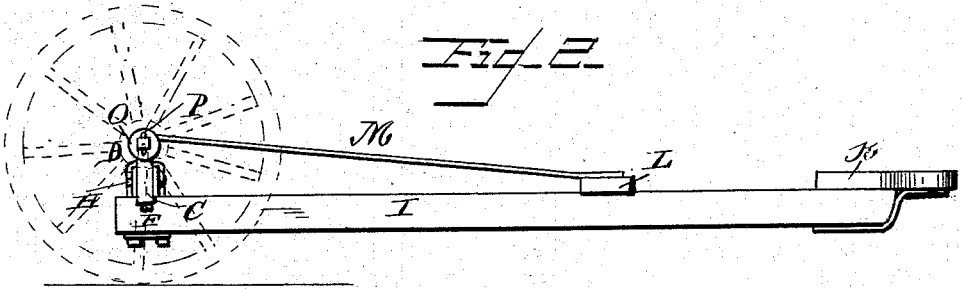
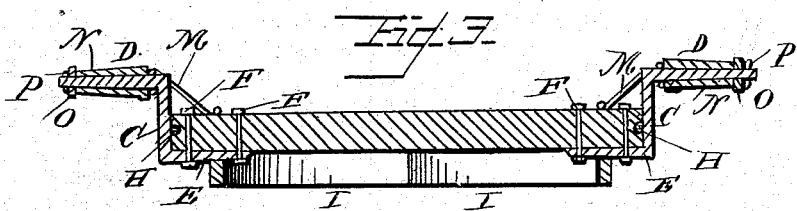
WITNESSES
F. L. Ourand
J. R. Sittell
INVENTOR
A. Turner
by A. Snow & Co.
Attorneys

UNITED STATES PATENT OFFICE.

ALEXANDER TURNER, OF FRANKLIN, INDIANA.

TRUCK FOR MOVING HARVESTERS.

SPECIFICATION forming part of Letters Patent No. 276,734, dated May 1, 1883.

Application filed December 2, 1882. (No model.)

*To all whom it may concern:*

Be it known that I, ALEXANDER TURNER, a citizen of the United States, residing at Franklin, in the county of Johnson and State of Indiana, have invented a new and useful Truck for Moving Self-Binders, of which the following is a specification, reference being had to the accompanying drawings.

This invention relates to an improved truck for moving self-binding harvesters; and it has for its object to provide a simple, convenient, and inexpensive device for this purpose.

To this end it consists in the improved construction and arrangement of parts, which will be hereinafter fully described, and particularly pointed out in the claim.

In the drawings hereto annexed, Figure 1 is a perspective view of my improved truck. Fig. 2 is a side view, and Fig. 3 is a vertical sectional view taken through the axle.

The same letters refer to the same parts in all the figures.

A represents the axle, the main body of which is made preferably of wood, and provided at the ends with vertical mortises B B, to receive the vertical parts C C of the metallic stub-axles D D. The latter, which may be made of ordinary square iron, are provided at their lower ends with inwardly-projecting arms E E, to receive the vertical bolts F, by which they are secured to the axle A. At their upper ends the vertical parts C are provided with outwardly-projecting brackets G, to receive the sleeves which form the spindles, as will be presently described. Bolts H H (or rivets of suitable construction) extend transversely through the axle A, flush with the inner ends of the mortises B, so as to clamp and hold the vertical parts C of the stub-axles and prevent the ends of the wooden axle from breaking or yielding.

The body of the truck consists of a frame the sides of which, I I, are bolted or clipped to the under side of the axle A, near the ends of the same, extending from thence forward until they meet, and are secured together by a forked clevis-plate, K, to which draft may be attached.

L is a plank or cross-bar secured transversely across the frame, and having its ends connected by metallic braces M with the inner ends of the brackets G of the stub-axles.

N N are metallic sleeves fitted upon the brackets G, where they are secured by washers O and pins P, or in any suitable manner. The ends of the braces M also form washers, against which the inner end of the sleeves N abut. Said sleeves form the spindles to receive the wheels of the truck; and by making these sleeves or spindles detachable, as shown, I am enabled to supply them of any desired size, so that the wheels of any ordinary wagon may be taken off and used upon the truck.

The operation of my invention will be readily understood. By lifting the grain-wheel of a harvester the truck, which has been mounted upon a pair of ordinary wagon-wheels, may be readily backed under it, and the machine thus loaded; or the machine may be driven up a pair of inclined blocks, which support it while the truck is being backed under it.

By the described construction of the frame and the use of the stub-axles the truck is made to hang very low, making it easy to load the machine.

The truck-frame may be supplied at a trifling cost, and takes but little room, and by the detachable spindles I enable the owner to use any ordinary wagon-wheels, instead of supplying special wheels for the truck.

The plate K, at the front end of the truck, may be kept off the ground by a suitable swiveled caster; but this forms no part of the invention, and is not shown in the drawings.

I claim as my invention—

As an improvement in trucks for moving harvesters, the combination of the axle A, having vertical mortises B B, the stub-axles D D, having their vertical parts C fitted in said mortises, the binding-bolts H, extending transversely through axle A, flush with the inner sides of the parts C of the stub-axles, the converging beams I I, secured to the under side of the axle A, the cross-bar L, the braces M, connecting the ends of said cross-bar with the brackets G of the stub-axles, and the detachable sleeves N, all arranged and operating as set forth.

In testimony that I claim the foregoing as my own I have hereto affixed my signature in presence of two witnesses.

ALEXANDER TURNER.

Witnesses:
J. REED LITTELL,
C. K. ALLEN.